United States Patent
Mehta et al.

(10) Patent No.: US 11,928,502 B2
(45) Date of Patent: Mar. 12, 2024

(54) OPTIMIZED NETWORKING THREAD ASSIGNMENT

(71) Applicant: VMware LLC, Palo Alto, CA (US)

(72) Inventors: Rishi Mehta, San Jose, CA (US); Boon S. Ang, Saratoga, CA (US); Petr Vandrovec, Cupertino, CA (US); Xunjia Lu, Los Altos, CA (US)

(73) Assignee: VMware LLC, Palo Alto, CA (US)

( * ) Notice: Subject to any disclaimer, the term of this patent is extended or adjusted under 35 U.S.C. 154(b) by 413 days.

(21) Appl. No.: 17/244,242

(22) Filed: Apr. 29, 2021

(65) Prior Publication Data
US 2022/0350647 A1  Nov. 3, 2022

(51) Int. Cl.
*G06F 9/44* (2018.01)
*G06F 9/455* (2018.01)
*G06F 9/48* (2006.01)
*G06F 9/54* (2006.01)
*H04L 67/60* (2022.01)

(52) U.S. Cl.
CPC ........ *G06F 9/4881* (2013.01); *G06F 9/45558* (2013.01); *G06F 9/4812* (2013.01); *G06F 9/547* (2013.01); *H04L 67/60* (2022.05); *G06F 2009/45583* (2013.01); *G06F 2009/45595* (2013.01)

(58) Field of Classification Search
CPC ..................................................... G06F 9/4881
USPC ....................................................... 718/100
See application file for complete search history.

(56) References Cited

U.S. PATENT DOCUMENTS

| | | | |
|---|---|---|---|
| 10,394,679 B2 | 8/2019 | Yu et al. | |
| 2003/0187914 A1 | 10/2003 | Kaniyar et al. | |
| 2010/0251234 A1* | 9/2010 | Oshins | G06F 9/4856 718/1 |
| 2012/0250512 A1 | 10/2012 | Jagadeeswaran et al. | |
| 2014/0161122 A1 | 6/2014 | Vasudevan | |
| 2015/0052287 A1* | 2/2015 | Venkatasubramanian | G06F 12/0891 711/6 |
| 2016/0092259 A1* | 3/2016 | Mehta | G06F 12/023 718/1 |
| 2017/0315840 A1 | 11/2017 | Yu et al. | |

\* cited by examiner

*Primary Examiner* — Timothy A Mudrick
(74) *Attorney, Agent, or Firm* — Quarles & Brady LLP

(57) ABSTRACT

Some embodiments provide a method for scheduling networking threads associated with a data compute node (DCN) executing at a host computer. When a virtual networking device is instantiated for the DCN, the method assigns the virtual networking device to a particular non-uniform memory access (NUMA) node of multiple NUMA nodes associated with the DCN. Based on the assignment of the virtual networking device to the particular NUMA node, the method assigns networking threads associated with the DCN to the same particular NUMA node and provides information to the DCN regarding the particular NUMA node in order for the DCN to assign a thread associated with an application executing on the DCN to the same particular NUMA node.

20 Claims, 5 Drawing Sheets

OPTIMIZED NETWORKING THREAD ASSIGNMENT

BACKGROUND

Virtual machines (VMs) in a datacenter may execute on host computers (host servers) with several non-uniform memory access (NUMA) nodes. Each NUMA node is typically associated with a socket of the host computer, though in some cases a socket may include multiple NUMA nodes. In general, sharing data across NUMA nodes introduces more latency as well as potentially more cache thrashing. As such, a typical VM operating on a host server is assigned to a single NUMA node, so that all of its memory accesses are to the same physical NUMA node. However, some VMs are too large for a single NUMA node, so techniques are required to minimize cross-node data sharing.

BRIEF SUMMARY

Some embodiments provide a method for scheduling networking threads for a data compute node (DCN), such as a VM, that spans multiple NUMA nodes of a host computer on which the DCN executes. Specifically, some embodiments schedule all networking threads associated with the DCN on the same particular NUMA node (i.e., one of the NUMA nodes spanned by the DCN) and provide information to the DCN regarding the particular NUMA node so that the DCN can attempt to schedule its own networking threads on that same particular NUMA node as well. In some embodiments, the particular NUMA node is the NUMA node to which a virtual networking device (e.g., a virtual network interface card (VNIC)) of the DCN is assigned.

While a typical VM will only span a single NUMA node, so that it is easy to schedule all networking threads (and any other threads) associated with that VM to the single NUMA node, certain VMs or other DCNs may span multiple NUMA nodes. In this case, a scheduler of the host computer's virtualization software tries to schedule all of the networking threads associated with the DCN over which the virtualization software scheduler has control to the same NUMA node as the VNIC of that DCN. These networking threads include both receive threads and transmit threads associated with the VNIC as well as receive threads and transmit threads associated with a physical networking device (e.g., a physical network interface card (PNIC)) of the host computer.

The virtualization software of the host computer virtualizes the physical hardware of the host computer, including the NUMA nodes and the PNIC. That is, in some embodiments, each physical NUMA (PNUMA) node (i.e., a set of processors that share a set of local memories) is virtualized into one or more virtual NUMA (VNUMA) nodes. When a VNIC is instantiated for the VM, this VNIC is assigned to one of the VNUMA nodes. Based on this assignment, the scheduler assigns transmit and receive threads (i.e., threads used for handling outgoing and incoming data messages, respectively) associated with the VNIC to the same VNUMA node.

The PNIC transmit and receive threads are not as easy to assign to the same NUMA node as the VNIC, because the same PNIC can be shared among multiple VNICs (e.g., associated with different DCNs on the host computer). In some embodiments, if the scheduler determines that a particular PNIC thread is used for communication with the VNIC, then that PNIC thread is assigned to the particular NUMA node.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for scheduling networking threads for a data compute node (DCN), such as a virtual machine (VM), that spans multiple non-uniform memory access (NUMA) nodes of a host computer on which the DCN executes. Specifically, some embodiments schedule all networking threads associated with the DCN on the same particular NUMA node (i.e., one of the NUMA nodes spanned by the DCN) and provide information to the DCN regarding the particular NUMA node so that the DCN (e.g., a guest operating system of the DCN) can attempt to schedule its own networking threads on that same particular NUMA node as well. In some embodiments, the particular NUMA node is the NUMA node to which a virtual networking device (e.g., a virtual network interface card (VNIC)) of the DCN is assigned.

Figure 1:
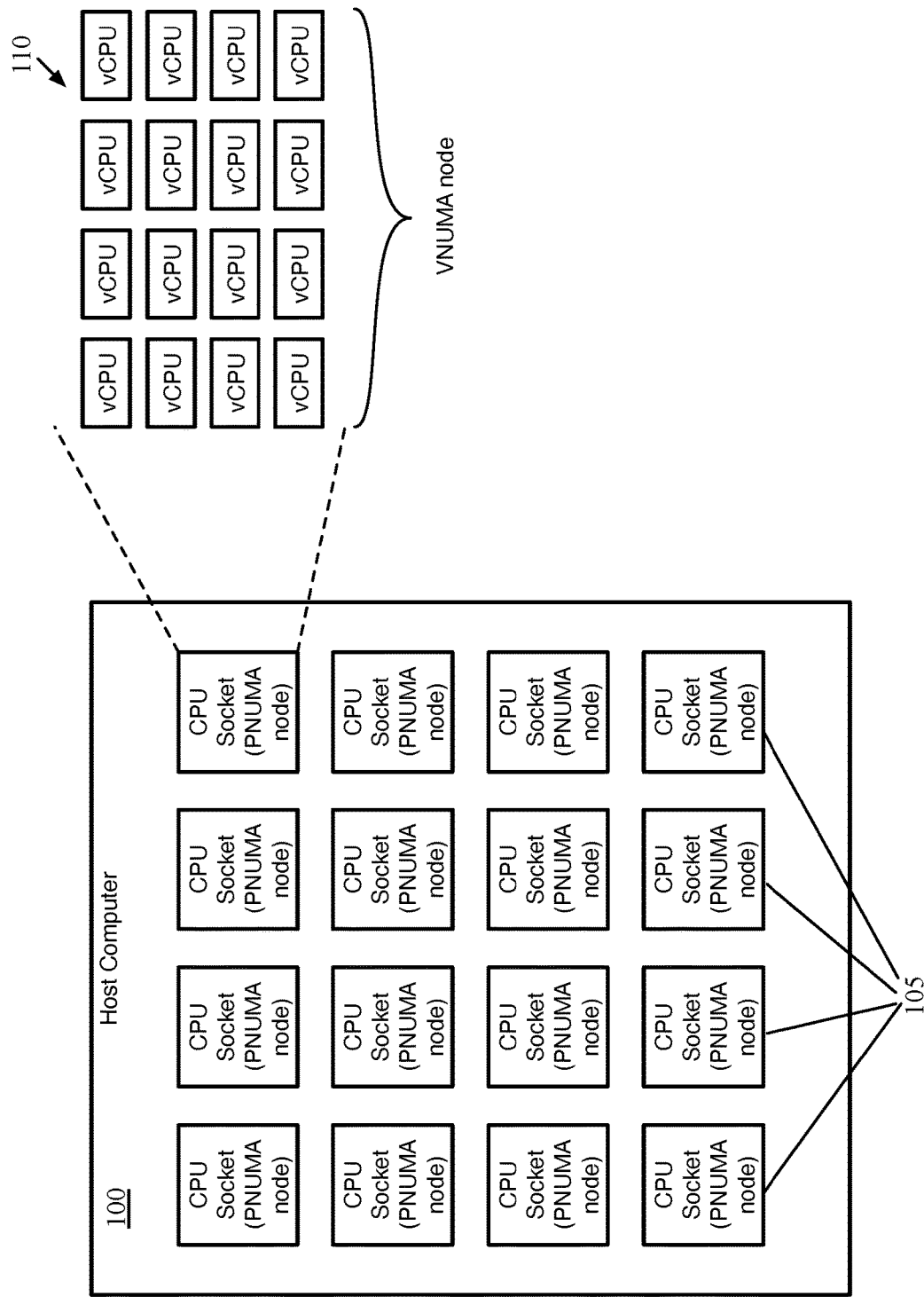
FIG. 1 conceptually illustrates the physical and logical processor configuration of a host computer of some embodiments.

FIG. 1 conceptually illustrates the physical and logical processor configuration of a host computer 100 of some embodiments. The host computer 100, as shown, includes 16 CPU sockets 105, each of which is its own physical NUMA (PNUMA) node. Each socket 105 is a connection to the motherboard of the host computer 100 for a processor core which includes one or more individual processing units. In some embodiments, as shown, each socket corresponds to a single PNUMA node, as the processing units local to that socket share a set of local memories. Other embodiments may be configured with multiple PNUMA nodes per socket (e.g., two sets of processing units with respective sets of local memories).

Host computers often only have two PNUMA nodes (e.g., one or two sockets), but the example host computer 100 of FIG. 1 includes sixteen separate sockets 105. Each of these CPU sockets 105 is virtualized (by virtualization software of the host computer 100) into one or more virtual CPUs (vCPUs) that can be assigned to DCNs (e.g., VMs) that execute on the host computer 100. In this example, each CPU socket 105 is virtualized into 16 vCPUs 110. In different embodiments, these vCPUs 110 may correspond 1:1 to individual processing units of the CPU socket or the number of vCPUs per socket might be different than the number of individual processing units of that socket.

The virtualization software of the host computer virtualizes the NUMA nodes as well in some embodiments. These virtual NUMA (vNUMA) nodes can map 1:1 to the PNUMA nodes in some embodiments, in which case the VNUMA nodes are simply how the virtualization software represents the NUMA nodes to the VMs, virtual networking devices, and other virtualization constructs that access virtual hardware. In other embodiments, the number of vNUMA nodes can differ from the number of PNUMA nodes on the host computer.

Host computers (e.g., in a datacenter) may host numerous DCNs, though in certain cases might only host a single VM. For instance, an entity (e.g., a datacenter tenant, an on-premises datacenter operator, etc.) might want to virtualize a bare metal (i.e., non-virtualized) workload that uses the majority of a server's process, in order to get the benefits of virtualization (easy migration of the workload, etc.). In such a case, the virtualized workload could be the only VM on a host computer such as that shown in FIG. 1, and would span numerous (if not all) of the NUMA nodes of the host computer.

When such a workload is implemented as a virtualized DCN, in some embodiments the networking for the DCN is handled in part by the virtualization software of the host computer on which the DCN executes. Whereas on a bare metal computer data messages can be sent directly to/from the physical network interface card (PNIC) of the computer to device memory via direct memory access (DMA) bypassing the CPUs, on a virtualized system the data messages pass through the virtualization software and therefore involve the CPUs.

Figure 2:
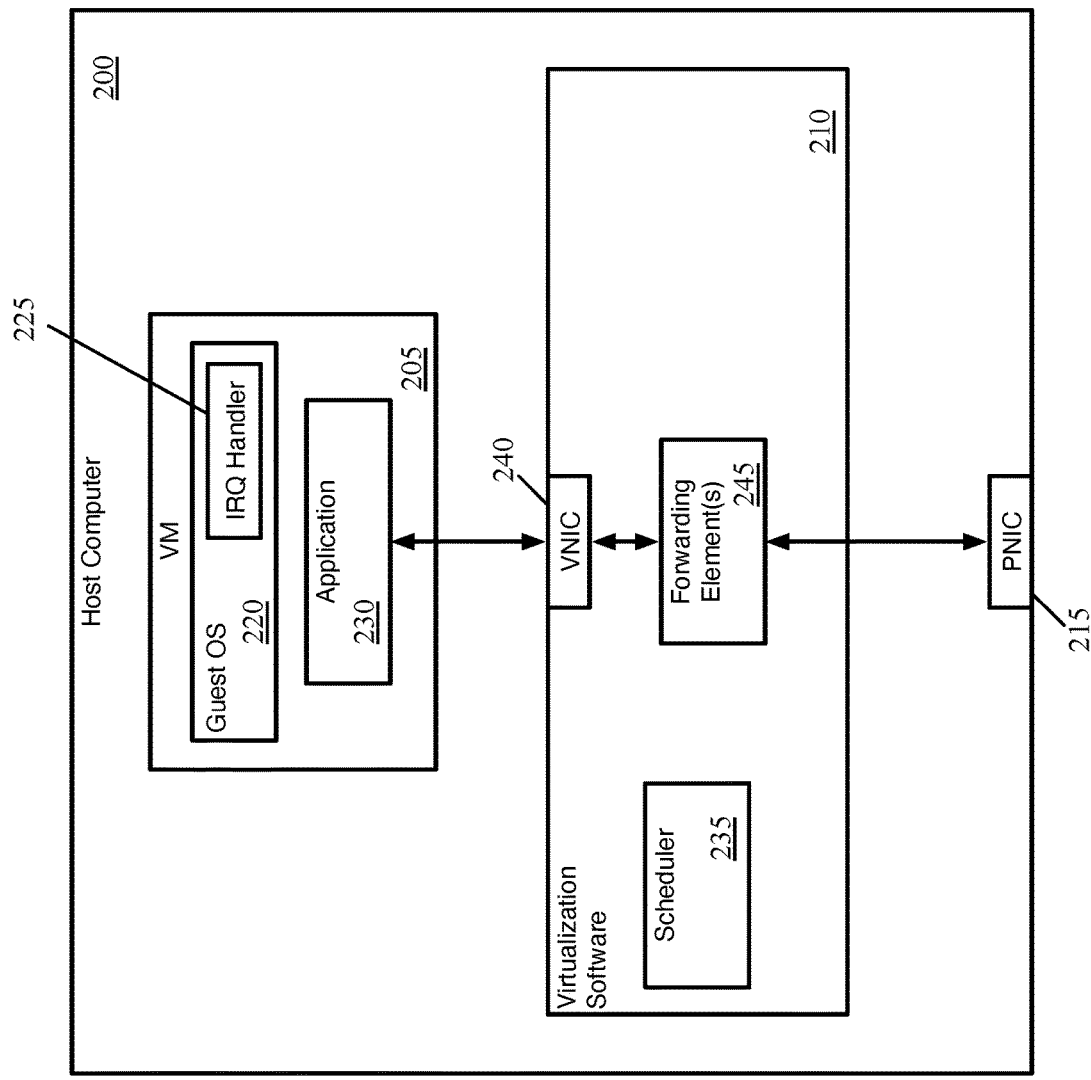
FIG. 2 conceptually illustrates the architecture of a host computer that hosts a VM.

FIG. 2 conceptually illustrates the architecture of a host computer 200 that hosts a VM 205. It should be understood that this figure specifically shows aspects of the architecture relevant to the discussion of networking thread assignment, and many other aspects of the virtualization software or VM would typically be present on such a host. As shown, the host computer 200 includes the VM 205, virtualization software 210 (e.g., a hypervisor), and PNIC 215. The VM 205 executes a guest operating system 220, which includes an interrupt request (IRQ) handler 225 for handling incoming data messages. The VM 205 also executes an application 230 on top of the operating system 220. As shown, the virtualization software 210 includes a scheduler 235, a VNIC 240 associated with the VM 205, and a set of forwarding elements 245 (e.g., virtual switches, virtual routers, etc.).

The application 230 can be a single application running on the VM 205, or one of multiple applications on the VM 205. Often a VM is configured to operate a single application for a specific purpose (e.g., as part of a distributed application, as part of an application cluster, etc.). This application 230 is a source and destination for data messages; the application 230 sends data messages (via the VNIC 240) and receives data messages from various sources (also via the VNIC 240). In addition, for received data messages, the application often has to perform various operations on the data.

While the guest operating system 220 may have numerous interrupt handlers, the IRQ handler 225 specifically handles data messages received by the VM 205 (e.g., at the VNIC 240 associated with the VM 205. The IRQ handler 225 of some embodiments copies received data messages to its own buffer in memory (e.g., from memory associated with the VNIC). As such, there is a benefit to the threads for the IRQ handler 225 being assigned to a vCPU that associates to the same NUMA node as the VNIC 240. Similarly, because the application 230 processes the data messages, this data will be copied to memory assigned to the application 230, and therefore at least the application threads associated with processing this data should be assigned to the same NUMA node as the VNIC 240 and IRQ handler 225.

It is common for VMs to only span a single NUMA node, such that it is easy to schedule all networking threads (and any other threads) associated with that VM to the single NUMA node. However, as noted above, certain VMs or other DCNs may span multiple NUMA nodes (e.g., 16 vNUMA nodes in the example shown in FIG. 1). In this case, if threads are simply load balanced across the NUMA nodes, then the threads for application 230 and IRQ handler 225 could be assigned to completely different NUMA nodes from each other, from the VNIC 240, and from the other virtualization software constructs that also have to process data messages (e.g., threads for transmit and receive queues). This would be inefficient for several reasons. First, memory access across NUMA nodes has a higher latency than within a NUMA node, so having processors access non-local memory repeatedly would slow down the operation of the application 230 on the VM 205. Furthermore, even in that context, repeated cross-NUMA memory access for the same data would lead to L3 cache thrashing. When a CPU in a first NUMA node accesses data from memory in a second NUMA node, that data is stored in the L3 cache of the first NUMA node for quicker subsequent access but evicted from the cache of the second NUMA node. Furthermore, if a CPU in a third NUMA node then requires the data, that data will be evicted from the L3 cache of the first NUMA node and stored in the L3 cache of the third NUMA node. Repeated access to data from different NUMA nodes, as could occur with a simple load balancing scheduling scheme, therefore also creates the inefficiency of cache thrashing as data is stored in and evicted from various caches.

The VNIC 240 is, as noted, a virtual networking device associated with the VM 205. Data traffic generated by the application 230 is sent to transmit queues of the VNIC 240 and data traffic directed to the application 230 is placed in receive queues of the VNIC 240. These queues are stored in memory of the host computer 200 and have associated threads that have to be assigned to different vCPUs (and thus to specific vNUMA nodes that correspond to PNUMA nodes of the host computer 200).

The forwarding elements 245 include virtual switches, virtual routers, and other virtualization software constructs that process the incoming and outgoing data traffic. In some embodiments, these forwarding elements 245 do not involve separate storage of the data traffic in memory, and thus there is no need to assign threads for these constructs to vCPUs associated with specific NUMA nodes.

The scheduler 235 of some embodiments is a virtualization software module that is tasked with assigning virtualization software threads to specific vCPUs (and therefore to specific vNUMA nodes). Specifically, the scheduler 235 is responsible for assigning threads associated with both transmit and receive queues of the VNIC 240 to specific vCPUs. In some embodiments, the scheduler 235 also assigns the VNIC 240 memory itself to a particular NUMA node, though in other embodiments this assignment is separate from the scheduler 235.

In some embodiments, the scheduler 235 is also responsible for assigning threads associated with transmit and receive queues of the PNIC 215 to NUMA nodes. As described below, aligning these threads on the same NUMA node as the VNIC can be more difficult because the PNIC queues are often shared between multiple VNICs (though this is less of an issue in the case of a host computer with a single VM that has a single VNIC).

Figure 3:
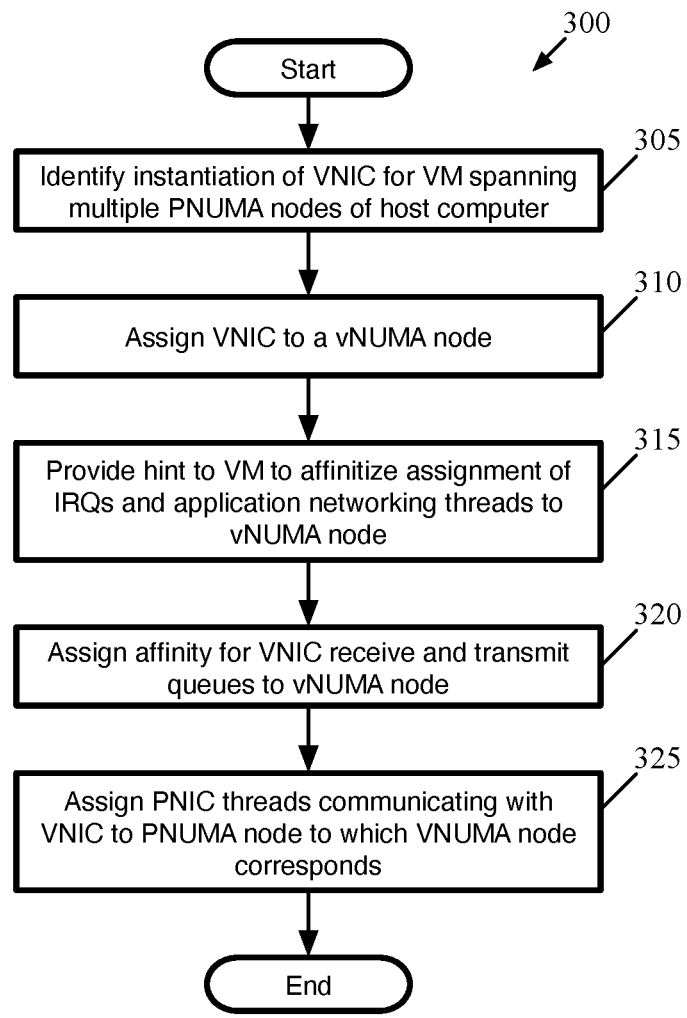
FIG. 3 conceptually illustrates a process of some embodiments for scheduling networking-related threads associated with a DCN.

FIG. 3 conceptually illustrates a process 300 of some embodiments for scheduling networking-related threads associated with a DCN. The process 300 is performed by the scheduler of a host computer's virtualization software in some embodiments, to attempt to schedule all of the networking threads on a single NUMA node of the host computer so as to minimize cross-memory access. Specifically, this process 300 relates to scheduling threads associated with a DCN that spans multiple NUMA nodes of a host computer. If a DCN was entirely assigned to a single NUMA node, then scheduling threads for all of the transmit queues, receive queues, etc. associated with that DCN and its VNIC(s) would be easy as all of the threads would be assigned to vCPUs associated with the same NUMA node. However, for VMs that require multiple NUMA nodes, scheduling networking threads on the same NUMA node can have significant advantages over standard load balancing of the threads. The process 300 will be described in part by reference to FIG. 4, which illustrates the scheduler 235 assigning threads for certain other components operating on the host computer shown in FIG. 2.

As shown, the process 300 begins by identifying (at 305) the instantiation of a VNIC for a VM (or other DCN) that spans multiple PNUMA nodes of a host computer. In some embodiments, the virtualization software of the host computer assigns the VM to multiple vNUMA nodes, which in turn map to multiple PNUMA nodes of the host computer. In general, a VM is associated with at least one VNIC or other virtual networking device that acts as an interface for a virtualized DCN, as such a virtual networking device is typically required in order for the VM to send or receive messages.

The process 300 then assigns (at 310) the VNIC to a vNUMA node. The VNIC (or other virtual networking device) has an associated buffer (or multiple buffers, e.g., receive and transmit buffers), which are assigned to particular memory locations corresponding to a particular NUMA node. In some embodiments, the scheduler performs this assignment for the VNIC. However, in other embodiments, other modules of the virtualization software assign the VNIC to a vNUMA node, or the VNIC is assigned based on a user configuration.

Based on this assignment, the process 300 provides (at 315) a hint to the VM to affinitize the assignment of IRQ handler and application networking threads to the same vNUMA node. The scheduler in the virtualization software is not responsible for scheduling the threads for applications/modules executing within the VM itself in some embodiments, as this is handled by the operating system of the guest VM.

Figure 4:
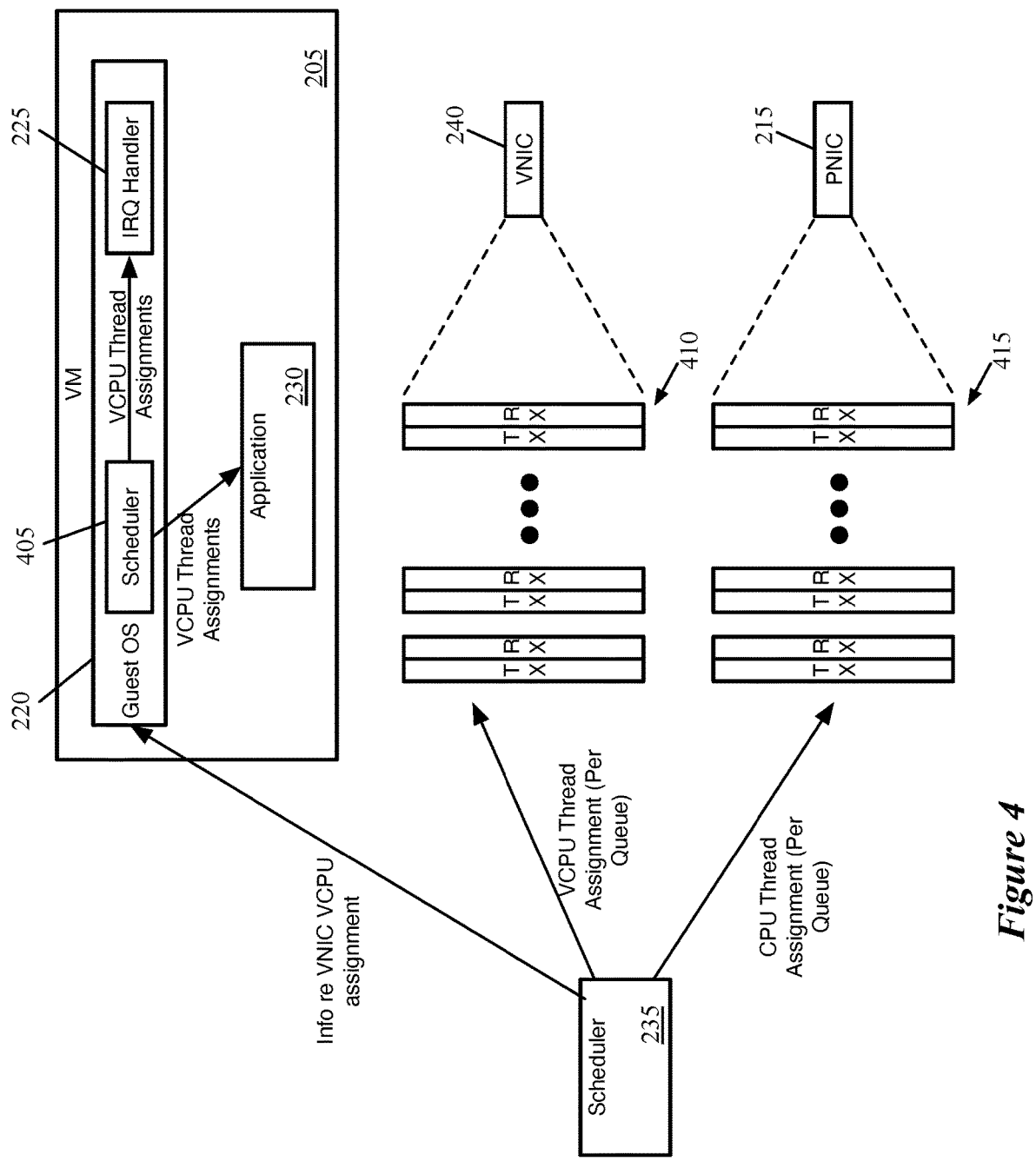
FIG. 4 conceptually illustrates the scheduler assigning threads for certain other components operating on the host computer shown in FIG. 2.

Thus, as shown in FIG. 4, the virtualization software scheduler 235 sends information regarding the NUMA node assignment of the VNIC 240 to the VM 205 (e.g., to the operating system 220). The operating system 220 executes its own scheduler 405 in some embodiments, which handles scheduling threads to vCPUs for the various applications and modules executing in the VM 205. Based on the hint from the virtualization software scheduler 235, the guest operating system scheduler 405 should assign the thread for the IRQ handler 225 (i.e., the IRQ handler that handles data messages received at the VNIC 240) as well as threads related to sending and receiving data messages for the application 230. In some embodiments, the application 230 has multiple execution threads for different operations, and the scheduler 405 load balances the threads that have their own separate memory accesses (i.e., that are not expected to result in cross-node memory accesses) across vCPUs that do not necessarily map to the same NUMA node as the VNIC.

The process 300 also assigns (at 320) affinity for VNIC receive and transmit queues to the vNUMA node to which the VNIC memory is assigned. Based on this static affinity assignment, the virtualization software scheduler can assign receive and transmit threads associated with each VNIC queue to vCPUs that map to the same NUMA node as the VNIC memory. FIG. 4 illustrates that the VNIC 240 has sets of paired receive (rx) and transmit (tx) queues 410. In some embodiments, each queue pair of the VNIC has an associated receive thread and an associated transmit thread, for respectively handling incoming and outgoing data messages. In some embodiments, these threads are executed within the virtualization software kernel (e.g., the vmkernel of an ESX hypervisor). The receive queues are managed by the virtualization software in some embodiments, while corresponding transmit queues are created according to the VM configuration. Different embodiments allow different numbers of receive/transmit queue pairs for a VNIC (e.g., up to 8 in some cases), with more queues typically enabling higher bandwidth. As shown in the figure, the scheduler 235 assigns the threads for each of these queues 410 to vCPUs that map to the same NUMA node as the VNIC 240.

The process 300 also assigns (at 325) PNIC threads communicating with the VNIC to the PNUMA node to which the VNUMA node corresponds. The process 300 then ends, although it should be noted that this is a conceptual process and these operations may not occur linearly. Rather, the assignment of PNIC or VNIC threads could take place over time as these threads are needed. FIG. 4 also illustrates that the PNIC 215 has its own sets of paired receive and transmit queues 415. Like the VNIC, in some embodiments each queue pair has an associated receive thread and an associated transmit thread. These queues 415 are also managed by the virtualization software in some embodiments, and the scheduler 235 is shown assigning the threads for these queues 415 to CPUs. It should be noted that not all of the PNIC queue threads will be assigned to the same NUMA node as the VNIC. If there are other VMs executing on the host computer, then the PNIC may be shared among multiple VNICs associated with these different DCNs. In some embodiments, when the scheduler determines that a particular PNIC thread is used for communication with the VNIC (i.e., the PNIC thread is handling data traffic sent to or from the DCN with which the VNIC is associated), then the scheduler assigns that PNIC thread to a CPU belonging to the same NUMA node as the VNIC.

It should be noted that while the above description relates to assigning all networking threads (or as many as possible) to the same NUMA node, some embodiments instead allow the threads to be assigned to different NUMA nodes. In this case, the scheduler attempts to minimize the amount of shared memory across threads. If two threads will require sharing memory with each other, then the scheduler will attempt to place those on the same NUMA node in some such embodiments. In some embodiments, this approach requires ensuring that the memory the VNIC queues access is always dedicated, so that the threads for each queue can access the memory as needed without affecting the performance of other queues.

It should also be noted that the approach of affinitizing networking threads to a specific NUMA node can be applied to other purposes. While described in terms of a large VM running a resource-intensive application, this approach could also be applied to operations such as a storage device, with all of the storage networking threads being assigned to a particular NUMA node.

Figure 5:
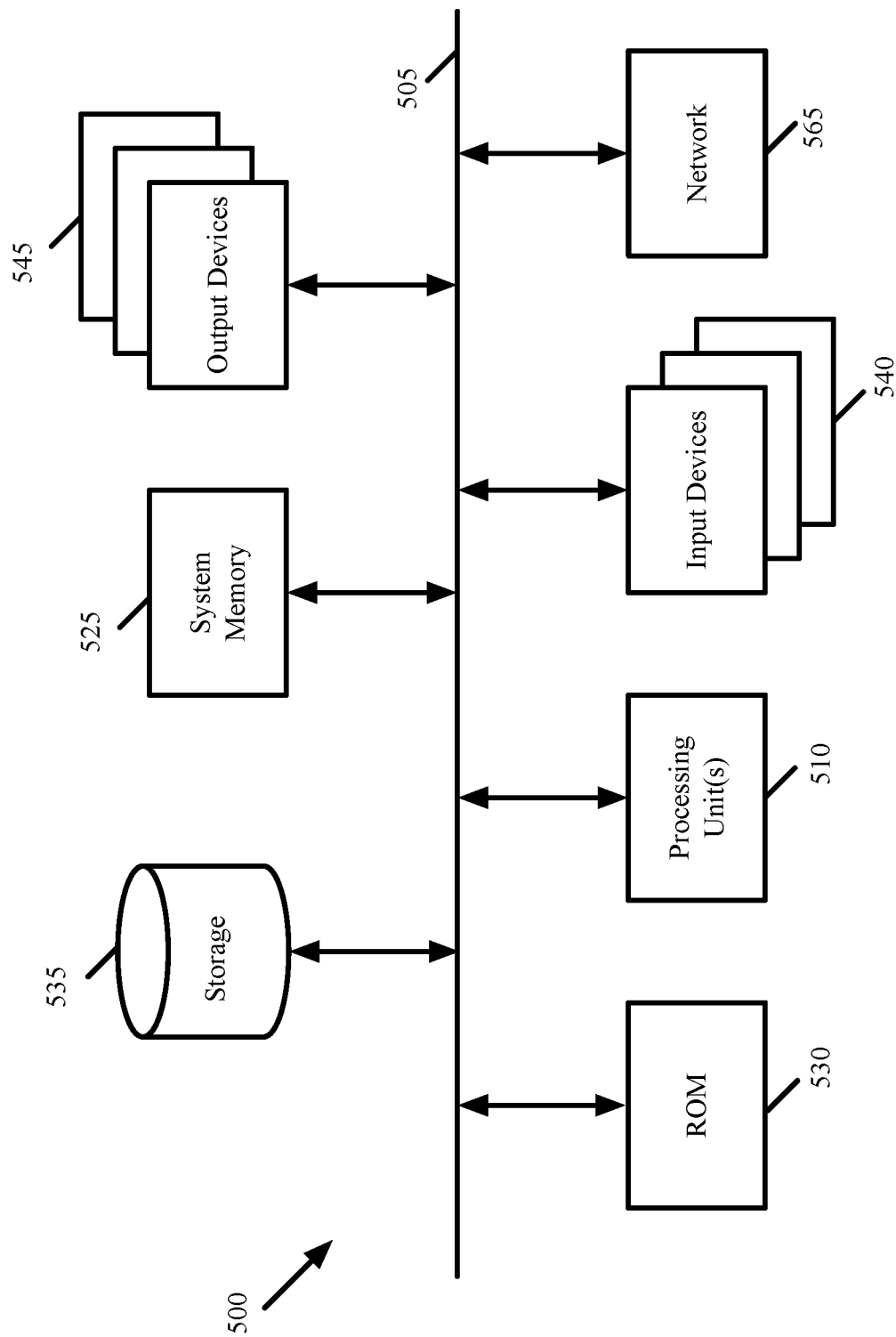
FIG. 5 conceptually illustrates an electronic system with which some embodiments of the invention are implemented.

FIG. 5 conceptually illustrates an electronic system 500 with which some embodiments of the invention are implemented. The electronic system 500 may be a computer (e.g., a desktop computer, personal computer, tablet computer, server computer, mainframe, a blade computer etc.), phone, PDA, or any other sort of electronic device. Such an electronic system includes various types of computer-readable media and interfaces for various other types of computer-readable media. Electronic system 500 includes a bus 505, processing unit(s) 510, a system memory 525, a read-only memory 530, a permanent storage device 535, input devices 540, and output devices 545.

The bus 505 collectively represents all system, peripheral, and chipset buses that communicatively connect the numerous internal devices of the electronic system 500. For instance, the bus 505 communicatively connects the processing unit(s) 510 with the read-only memory 530, the system memory 525, and the permanent storage device 535.

From these various memory units, the processing unit(s) 510 retrieve instructions to execute and data to process in order to execute the processes of the invention. The processing unit(s) may be a single processor or a multi-core processor in different embodiments.

The read-only-memory (ROM) 530 stores static data and instructions that are needed by the processing unit(s) 510 and other modules of the electronic system 500. The permanent storage device 535, on the other hand, is a read-and-write memory device. This device 535 is a non-volatile memory unit that stores instructions and data even when the electronic system 500 is off. Some embodiments of the invention use a mass-storage device (such as a magnetic or optical disk and its corresponding disk drive) as the permanent storage device 535.

Other embodiments use a removable storage device (such as a floppy disk, flash drive, etc.) as the permanent storage device. Like the permanent storage device 535, the system memory 525 is a read-and-write memory device. However, unlike storage device 535, the system memory 525 is a volatile read-and-write memory, such a random-access memory. The system memory 525 stores some of the instructions and data that the processor needs at runtime. In some embodiments, the invention's processes are stored in the system memory 525, the permanent storage device 535, and/or the read-only memory 530. From these various memory units, the processing unit(s) 510 retrieve instructions to execute and data to process in order to execute the processes of some embodiments.

The bus 505 also connects to the input and output devices 540 and 545. The input devices 540 enable the user to communicate information and select commands to the electronic system 500. The input devices 540 include alphanumeric keyboards and pointing devices (also called "cursor control devices"). The output devices 545 display images generated by the electronic system 500. The output devices 545 include printers and display devices, such as cathode ray tubes (CRT) or liquid crystal displays (LCD). Some embodiments include devices such as a touchscreen that function as both input and output devices.

Finally, as shown in FIG. 5, bus 505 also couples electronic system 500 to a network 565 through a network adapter (not shown). In this manner, the computer can be a part of a network of computers (such as a local area network ("LAN"), a wide area network ("WAN"), or an Intranet, or a network of networks, such as the Internet. Any or all components of electronic system 500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for scheduling networking threads associated with a data compute node (DCN) executing at a host computer, the method comprising:
   when a virtual networking device is instantiated for the DCN, assigning the virtual networking device to a particular non-uniform memory access (NUMA) node of a plurality of NUMA nodes associated with the DCN;
   based on the assignment of the virtual networking device to the particular NUMA node:
      assigning networking threads associated with the DCN to the same particular NUMA node; and
      providing information to the DCN regarding the particular NUMA node in order for the DCN to assign a thread associated with an application executing on the DCN to the same particular NUMA node.

2. The method of claim 1, wherein the method is performed by a scheduler executing in virtualization software of the host computer.

3. The method of claim 2, wherein:
   the scheduler is not responsible for assigning threads associated with the application to NUMA nodes; and
   the DCN schedules threads associated with the application executing on the DCN.

4. The method of claim 2, wherein the scheduler provides information to the DCN regarding the assignment of the virtual networking device to the particular NUMA node because if the thread associated with the application is assigned to a different NUMA node then data is transferred across NUMA nodes.

5. The method of claim 1, wherein assigning networking threads associated with the DCN comprises (i) assigning a set of transmit threads of a physical networking device of the host computer and (ii) assigning a set of receive threads of the physical networking device.

6. The method of claim 5, wherein the physical networking device is shared between a plurality of virtual networking devices that are assigned to at least two different NUMA nodes, including the particular NUMA node.

7. The method of claim 6, wherein assigning networking threads associated with the DCN to the particular NUMA node comprises:
   determining that a particular thread of the physical networking device is used for communication with the virtual networking device; and
   based on the determination, assigning the particular thread to the particular NUMA node.

8. The method of claim 1, wherein assigning networking threads associated with the DCN comprises (i) assigning a set of transmit threads of the virtual networking device to the particular NUMA node and (ii) assigning a set of receive threads of the virtual networking device to the particular NUMA node.

9. The method of claim 1, wherein:
   the DCN is a virtual machine (VM);
   the virtual networking device is a virtual network interface card (VNIC) of the VM; and
   the VNIC is associated with a physical network interface card (PNIC) of the host computer.

10. The method of claim 1, wherein the DCN further uses the information regarding the particular NUMA node to assign an interrupt request (IRQ) handler thread to the particular NUMA node.

11. A non-transitory machine-readable medium storing a program which when executed by at least one processing unit schedules networking threads associated with a data compute node (DCN) executing at a host computer, the program comprising sets of instructions for:
   when a virtual networking device is instantiated for the DCN, assigning the virtual networking device to a particular non-uniform memory access (NUMA) node of a plurality of NUMA nodes associated with the DCN;
   based on the assignment of the virtual networking device to the particular NUMA node:
      assigning networking threads associated with the DCN to the same particular NUMA node; and
      providing information to the DCN regarding the particular NUMA node in order for the DCN to assign a thread associated with an application executing on the DCN to the same particular NUMA node.

12. The non-transitory machine-readable medium of claim 11, wherein the program is a scheduler executing in virtualization software of the host computer.

13. The method of claim 12, wherein:
the scheduler is not responsible for assigning threads associated with the application to NUMA nodes; and
the DCN schedules threads associated with the application executing on the DCN.

14. The non-transitory machine-readable medium of claim 12, wherein the scheduler provides information to the DCN regarding the assignment of the virtual networking device to the particular NUMA node because if the thread associated with the application is assigned to a different NUMA node then data is transferred across NUMA nodes.

15. The non-transitory machine-readable medium of claim 11, wherein the set of instructions for assigning networking threads associated with the DCN comprises sets of instructions for:
assigning a set of transmit threads of a physical networking device of the host computer; and
assigning a set of receive threads of the physical networking device.

16. The non-transitory machine-readable medium of claim 15, wherein the physical networking device is shared between a plurality of virtual networking devices that are assigned to at least two different NUMA nodes, including the particular NUMA node.

17. The non-transitory machine-readable medium of claim 16, wherein the set of instructions for assigning networking threads associated with the DCN to the particular NUMA node comprises sets of instructions for:
determining that a particular thread of the physical networking device is used for communication with the virtual networking device; and
based on the determination, assigning the particular thread to the particular NUMA node.

18. The non-transitory machine-readable medium of claim 11, wherein the set of instructions for assigning networking threads associated with the DCN comprises sets of instructions for:
assigning a set of transmit threads of the virtual networking device to the particular NUMA node; and
assigning a set of receive threads of the virtual networking device to the particular NUMA node.

19. The non-transitory machine-readable medium of claim 11, wherein:
the DCN is a virtual machine (VM);
the virtual networking device is a virtual network interface card (VNIC) of the VM; and
the VNIC is associated with a physical network interface card (PNIC) of the host computer.

20. The non-transitory machine-readable medium of claim 11, wherein the DCN further uses the information regarding the particular NUMA node to assign an interrupt request (IRQ) handler thread to the particular NUMA node.

* * * * *